Figure 1:
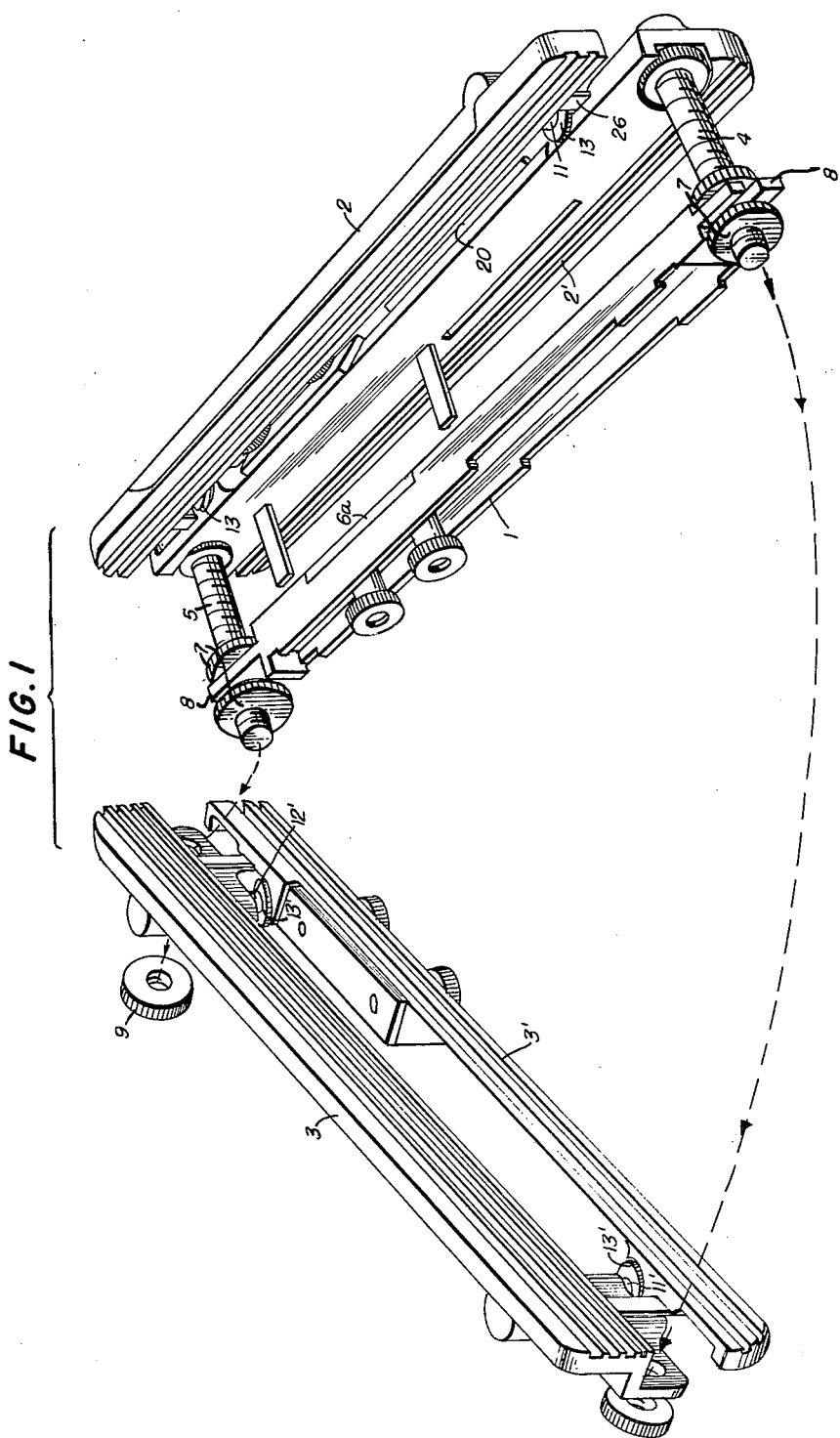

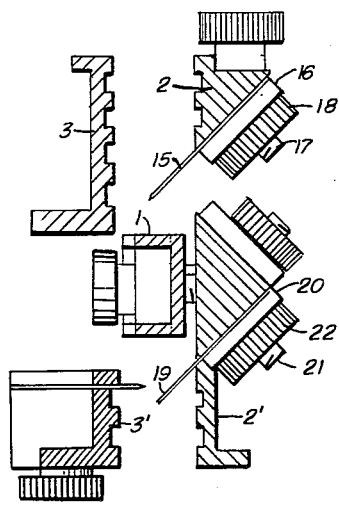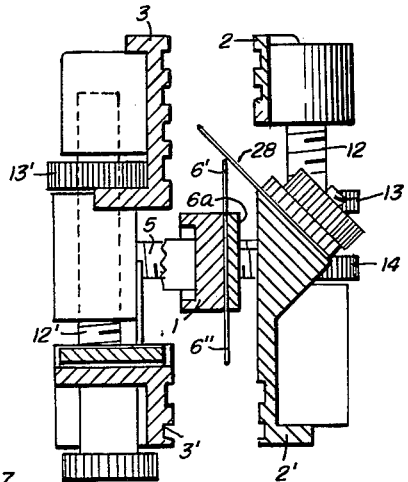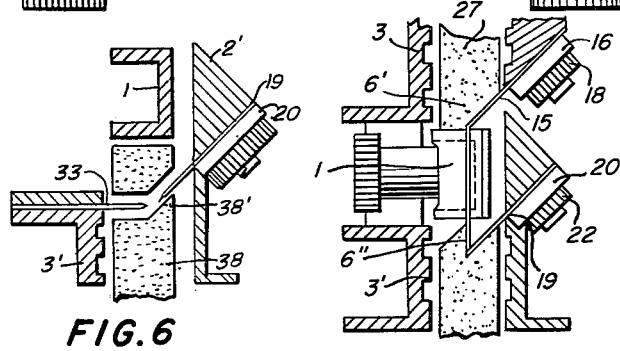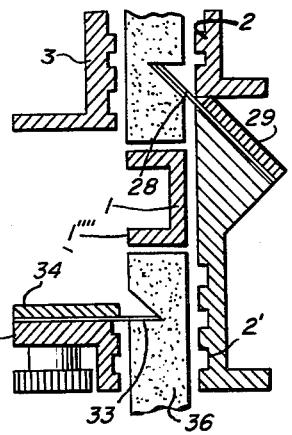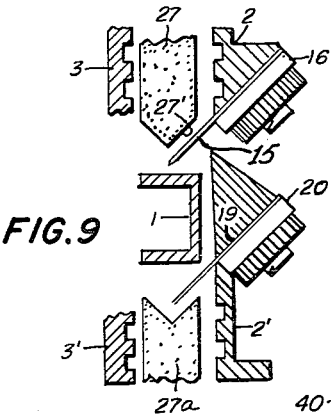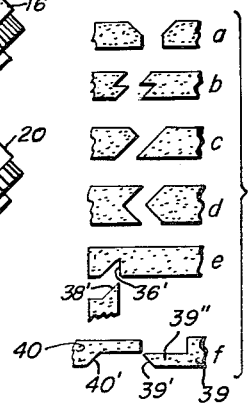

United States Patent Office 3,110,104
Patented Nov. 12, 1963

3,110,104
PROFILING HAND CUTTER
Werner Wicki and Franz Rothen, Langendorf, Solothurn, and Theodor Krebs, Kreuzlingen, Switzerland; said Wicki and said Rothen assignors to said Krebs
Filed Dec. 10, 1959, Ser. No. 858,764
Claims priority, application Switzerland Dec. 10, 1958
10 Claims. (Cl. 30—293)

This invention relates to a woodworking cutter or the like for cutting profiles, particularly matching profiles, in flat sheet-like members, such as composition boards, panels, and the like, for fitting said members together. Hitherto, planes have been used for cutting chamfered and rabbeted edges, the joint between the sheet-like members being formed by fitting the male and female profiles of the edges together. In order to prevent such joints from warping it was necessary to secure the joint with a batten or other suitable and sufficiently narrow backing structure.

The known planes employed for making matching profiles consisted of a base or soleplate which was guided on the flat face of the board or panel, and which carried at least one cutting blade adjustably affixed thereto in the working direction.

For cutting grooves and rabbets planes are known which have two cutting blades, of which one is adjustable perpendicularly to the sole, whereas the other is adjustable in a fence which can itself be moved perpendicularly to and parallel with the sole. The plane is used by placing the sole of the plane on the face of the board or panel, and the fence against the edge for guiding the plane along the edge.

In order to reduce the number of different types of plane cutting blades arranged perpendicular to, parallel with, and oblique to the sole they have been fitted in tandem in a single combination plane. It has also been proposed, in the case of planes with two relatively perpendicular cutting blades, to mount the supporting members of the blades tiltably in such a way that all the different types of work can be performed with one plane. In principle all the above described planes agree in that they are used by placing the sole of the plane on the face of the board or panel that is to be worked. This fact limits the type of cut that can be made to the chamfers, grooves, and rabbets that have been described above.

The cutting device proposed by the present invention is not a plane in the sense of forming "shavings," but is characterised in that the device consists of a soleplate and two parallel fences arranged perpendicularly to said soleplate, the fences and soleplate being adapted to carry cutting blades which are adjustably affixed thereto, and in that for cutting the profiles the edge of the board or sheet-like member is inserted between the fences in such manner that the sole of the plane bears on the edge of the sheet-like member, and the blades incise the panel.

The profiles that can be cut with a cutting device according to the invention are characterised in that the cross section of the edge profile of one board or sheet-like member may have the general contour of one or several teeth and the cross section of the matching edge profile of the cooperating sheet member may have the general contour of one or more notch-like gaps for the reception of said tooth or teeth.

Figure 2:
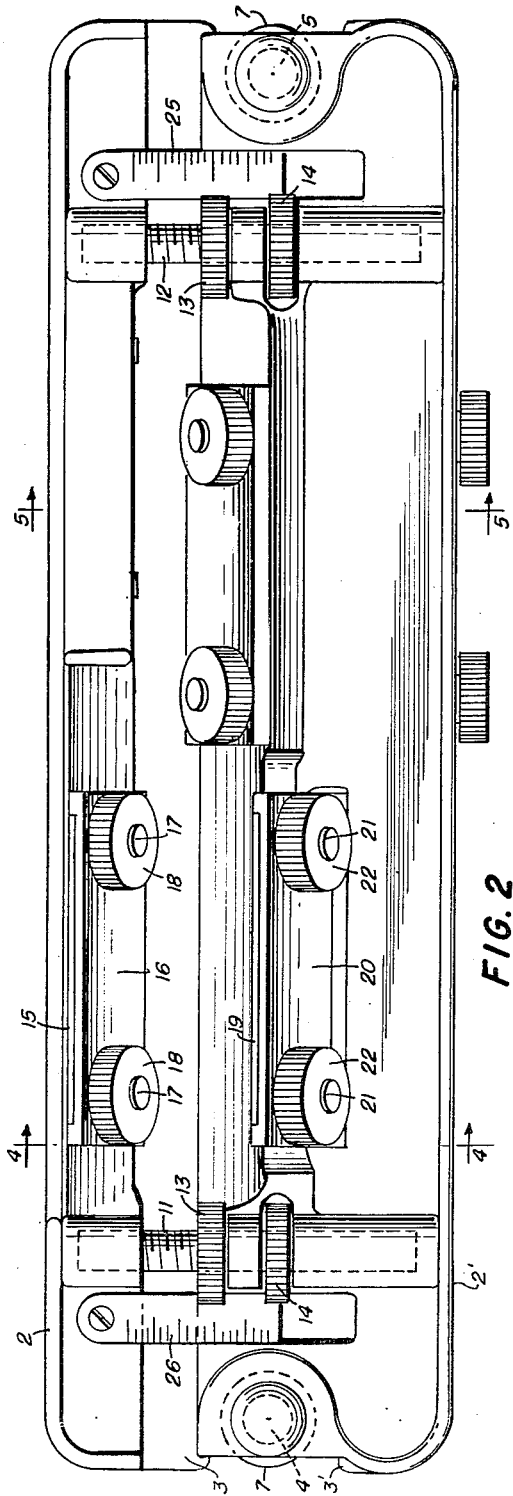
Figure 3:
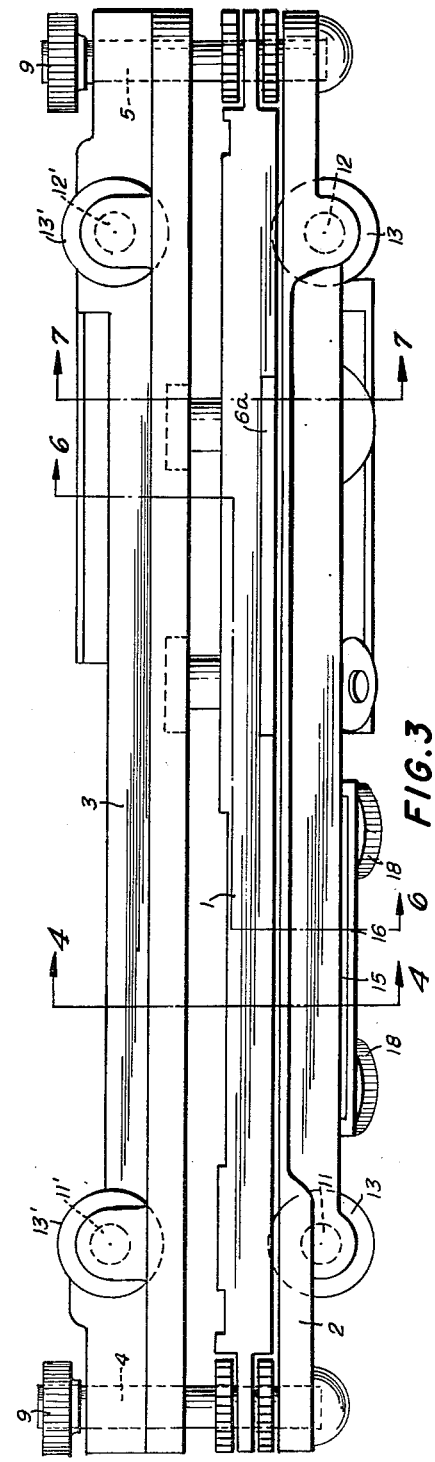

Embodiments of the subject matter of the invention will be described by reference to the accompanying drawings in which FIGURE 1 is an exploded perspective view of a device according to the invention, FIGURE 2 is an elevation of the device of FIGURE 1 assembled, FIGURE 3 is a plan view of the device of FIGURE 2, FIGURE 4 is a section taken at 4—4 of FIGURE 3, FIGURE 5 is a section taken at 5—5 of FIGURE 2, FIGURES 6, 7, 8 and 9 are diagrammatic views showing how the cutting blades are positioned in the several blade holders to make the desired cuts in the material, FIG. 6 being on section 6—6 of FIGURE 3, and FIGURE 7 being on line 7—7 of FIGURE 3, and FIGURES 8 and 9 being on line 4—4 of FIGURE 3, and FIGURE 10 shows six joints that may be cut using the device of the present invention.

In the drawings 1 is the soleplate of the plane, whereas 2, 3 and 2', 3' are the fences arranged in parallel at right angles to said soleplate 1, 2, 3 on one side and 2', 3' on the other side of soleplate 1. Each end of lower member 2' of one fence 2, 2' carries on that side which faces the other fence 3' perpendicularly projecting bolts 4, 5, the soleplate 1 and the second fence 3, 3' being adjustably displaceably mounted on said bolts. On that side of the soleplate 1, which is closest to the first fence 2, 2', the soleplate carries a blade 6 parallel with the fences, of which cutting edges 6' and 6" may project above and below the soleplate, and which may be clamped to the soleplate by means of a clamping plate 6a.

The blade 6 and all other blades used in this device are incising blades and make only incisions in the sheet material cut. Where two incisions intersect or where one incision intersects two surfaces, a part of the material is, of course, severed from the sheet.

Between the two fences 2, 2' and 3, 3' a nut 7 is provided on each of the two bolts 4 and 5. These nuts 7 are engaged by the forked ends 8 of the soleplate 1. By rotation of the nuts 7 the position of the soleplate 1 between the two fences, and hence the position of blade 6 can be adjusted. For spacing the second fence 3, 3' in relation to the face of the first fence 2, 2' the two bolts 4 and 5 each carries a further nut 9 and counternut 10 between which fence 3, 3' is clamped.

Firmly connected with the upper member 2 of the first fence 2, 2' at each end thereof and projecting perpendicularly towards the adjacent face of the member 2' of the first fence are threaded guide pins 11, 12 which are held between nuts 13 and counternuts 14 to support the upper member 2 of the first fence. Similar guide pins 11', 12' are provided to adjust the relative position of fence portions 3 and 3'. Blade 15, as shown in FIG. 4, is held in the required position in relation to the upper face of the soleplate 1 by adjustment using nuts 13 and 14. This blade 15 rests on a sloping face of the upper member 2 of the first fence and is adjustably clamped in position by a clamping plate 16, bolts 17, and nuts 18, the blade projecting into the gap between the fences above the soleplate as seen in FIGURE 4. In an analogous manner a further blade 19 may be mounted on a sloping face of the lower member 2' of the first fence and adjustably clamped in position by a back plate 20, bolts 21, and nuts 22, the blade projecting into the gap between the two fences below the soleplate as seen in FIGURE 4.

Similar arrangements are provided for adjustment of 3 and 3'.

As seen from FIGS. 4 and 5 there are four blade holders provided to hold blades extending from the fences into the space between the fences, and one blade holder in the soleplate to hold a blade that can be a double-edged blade 6, 6', 6" or can be a single blade extending either into the space between fences 2, 3 or fences 2', 3'. In FIGURE 7, when the panel 36 is passed between the fences 2, 3 the cutter 28 incises the panel in a plane at an angle to the face of the panel and blade 33' incises the panel in a plane normal to the surface of the panel and intersecting the incision made by blade 28.

The profile cut on panel 38 in FIGURE 6 in a single pass will mate with the profile cut on panel 36 in FIGURE 7 to extend at right angles, tooth 38' extending into groove 36' to form the joint seen at e in FIGURE 10.

It will be noted that if a panel were passed once through the upper portion of the plane as seen in FIGURE 4, its profile cut by properly adjusted blade 15 would mate with the profile cut in panel 38 in FIGURE 6 to join the panels in flush edge-to-edge position.

Only those cutters required to form the desired profile are used. For instance, a cutter 6, used to cut the profile desired in FIGURE 8, is not used in FIGURE 6 or 7. For the purpose of facilitating parallel adjustment of member 2 in relation to member 2' of the first fence the two ends of the lower member 2' of the first fence 2, 2' on their outer faces and flush therewith each carries a graduated plate 25, 26 extending perpendicularly in relation to the face of said lower member 2' which faces the upper member 2, into appropriate grooved recesses in the upper member 2.

In order to cut the edge of a board or panel 27 (see FIG. 9) into the profiles required for forming the joint d of FIG. 10, the two fences 2, 2' and 3, 3' are adjusted to the thickness of the panel 27 with the aid of the nuts and counternuts 9 and 10 (the blade 6 on soleplate 1 removed), and blades 15 and 19 are adjusted to cut panel 27 at the complementary angles required and halfway through the panel. The panel 27 is then pushed into the gap between the two fences 2 and 3 and the upper face of the soleplate can be moved along the edge of the panel 27 by hand. This operation produces a chamfer cut at 27'. The panel is now removed, turned around, and reintroduced between the fences 2' and 3. The plane will now chamfer the other side of panel 27. The edge of a panel 27a to fit panel 27 is similarly cut by two passes of the edge through the fences 2', 3' to be cut by blade 19. By these two operations two profiles of exactly complementary profile can be cut into the edges of two panels that are to be joined. This permits a very reliable flush joint to be formed when the joint faces are glued and the two edges fitted together, no battening being required as was hitherto necessary to prevent the joint from warping.

FIGURE 10 shows several different joints that can be accurately made. The joints d and e have been described above. FIGURE 8 shows diagrammatically how the blades can be arranged to make joint b by setting blade 15 to bevel one edge of the panel, blades 6', 6" to make a central cut parallel to fences 2, 3 and 2', 3', and setting blade 19 to cut parallel to the bevel cut by 15 and intersecting the cut made by blade 6".

In making a joint such as f, in FIGURE 10, the procedure is to bevel one edge of a panel 39 as seen at 39' in FIGURE 10f, using blade 15 as seen in FIGURE 4, for instance. After beveling the appropriate edge, the blades 6 and 33 are set between fences to cut the rabbet 39" in the right-hand side of the joint seen in FIGURE 10f. The mating part of the joint 40' is formed by passing the edge of mating panel 40 through between fences 2, 3 to be cut by blades 15 and 6'.

It will be evident from the above that a plane has been provided that can be armed with several blades set in the several blade holders to cut a great many different mating edges in sheet material of widely different thicknesses.

What is claimed is:

1. A jointing tool for panels comprising a soleplate having parallel faces back to back, each presenting a sole surface, two fences arranged parallel to each other forming fences for each of said faces of said soleplate, said fences being adjustable in the direction of the planes of said sole surfaces, and cutting blades carried by at least one of said fences and by said soleplate so that a panel edge passed successively between said fences using first one then the other sole surface will be cut to a shape complementary to a second panel edge similarly cut.

2. A cutting device for cutting profiles, particularly matching profiles at the edges of flat sheet-like members, such as fiber board, panels and the like, for fitting said members together, comprising a sole plate having two opposed parallel sole surfaces and two parallel fences arranged perpendicularly to said sole plate, means to selectively position said soleplate with respect to the parallel faces of a panel to be cut, cutting blades adjustably affixed in said fences and in said soleplate for cutting complementary profiles in the edges of said panels, said cutting blades extending into the space between the fences in such manner that the sole of the device bears on the panel edge when in use to position the cut made by said cutting blades.

3. A cutting device as claimed in claim 2, characterized in that a first of said fences carries two stems, one at each end of said first fence, and said stems project perpendicularly from that side of said first fence which faces the second said fence, the soleplate and the second fence being slidably adjustably mounted on said stems, and the soleplate carries a two-edged cutting blade which extends and is adjustably affixed in a plane parallel with the fences, the two cutting edges of said cutting blade projecting one above and one below the soleplate and the cutting blade is secured to the soleplate by bolts and nuts.

4. A cutting device as claimed in claim 3, characterized in that a nut means is mounted on each of the stems between the said two fences, and said soleplate has forked ends, said nuts being formed with grooves engaged by said forked ends of the soleplate, and each of the stems also carries a further nut and a counternut for fixing the second fence therebetween.

5. A cutting device as claimed in claim 1, in which a first member of a first fence carries at each of its ends a threaded guide pin projecting perpendicularly from that side of said member which faces away from the plane of said soleplate, a second member of said first fence carrying a cutting blade, said second member and the cutting blade being affixed thereto being adjustably mounted on said guide pins, a nut and a counter nut for locating said first member in relation to the adjacent face of the soleplate, a sloping face on said second member of said fence, a cutting blade supported by said sloping face to project into the gap between the fences adjacent the soleplate, a second sloping face on the second member of the said first fence, and a second blade supported by said face on the side of said soleplate remote from said first member to project into the gap between the fences and the soleplate.

6. A plane as claimed in claim 2, which includes a graduated plate affixed at the center of one said fence flush with a face of said soleplate and projects perpendicularly from the side of said one said fence which faces the other said fence and extends into an appropriate groove in the soleplate, each fence being formed of two parts adjustable toward and away from each other, and a graduated plate affixed at each end of the one fence part flush with the outer surface of said one fence part and projecting perpendicularly from the side of the part facing the other said part of said fence into appropriate recesses in the other said part of said fence.

7. A cutting device as claimed in claim 2 in which each fence is formed of an upper and a lower member and a sloping face is provided on the lower member of one said fence, a blade mounted on said sloping face projecting into the gap between the fences above the soleplate, and the upper member of said other fence on the side facing the lower member thereof is provided with perpendicularly projecting threaded guide pins to which the lower member is slidably and adjustably affixed in relation to the underface of the soleplate, a cutting block associated with said lower member of said other fence, said cutting blade extending approximately perpendicularly in relation to said pins and clamped so as to project into the gap between the fences underneath the soleplate.

8. A plane as claimed in claim 7, in which the cutting blade in the lower member of the one said fence, which projects into the gap between the fences underneath the soleplate is arranged to work in conjunction with the cutting blade on the lower member of said other fence.

9. In a profiling hand tool including a plurality of incising blades, a soleplate for supporting said tool with respect to a workpiece, and two fences one on each side of said soleplate, means for individually adjusting said fences with respect to said soleplate, and means in each fence and means in said soleplate to mount said blades to extend into the space bounded by said soleplate and said fences.

10. A profiling hand tool for cutting profiles into flat sheet-like members such as boards, of the type in which a panel edge forming a work piece is guided between parallel fences, said tool comprising a soleplate for supporting and guiding said tool with respect to said workpiece, and two fences, means mounting said fences perpendicularly to said soleplate, and adjustable incising blades, means to mount said blades in each of said fences and in said soleplate, at least one said blade being mounted at an angle to said parallel fences.

References Cited in the file of this patent

UNITED STATES PATENTS

| | | |
|---|---|---|
| 126,707 | Jensen | May 14, 1872 |
| 245,752 | Siegley | Aug. 16, 1881 |
| 318,331 | Walker | May 19, 1885 |
| 517,348 | Linderman | Mar. 27, 1894 |
| 1,249,674 | Schade | Dec. 11, 1917 |
| 1,413,395 | Donnelly | Apr. 18, 1922 |
| 1,627,258 | Sullivan | May 3, 1927 |
| 1,911,179 | Calleja | May 30, 1933 |
| 1,915,636 | Wendelken | June 27, 1933 |
| 2,053,382 | Stickley | Sept. 8, 1936 |
| 2,059,317 | Davis | Nov. 3, 1936 |
| 2,529,210 | Butler | Nov. 7, 1950 |

FOREIGN PATENTS

| | | |
|---|---|---|
| 372,359 | France | Feb. 18, 1907 |
| 697,937 | France | Nov. 5, 1930 |
| 920,444 | Germany | Nov. 22, 1954 |